United States Patent [19]

Bosch

[11] 3,735,960

[45] May 29, 1973

[54] CONTINUOUS MIXER

[75] Inventor: Hans Albert Bosch, Streamwood, Ill.

[73] Assignee: The Quaker Oats Company, Chicago, Ill.

[22] Filed: Feb. 28, 1972

[21] Appl. No.: 229,690

[52] U.S. Cl. .................................................. 259/8
[51] Int. Cl. ............................................. B01f 7/16
[58] Field of Search ....................... 259/8, 7, 6, 5, 23, 259/24, 107, 108

[56] References Cited

UNITED STATES PATENTS 1,268,813  6/1918  Benjamins .............................. 259/8
2,448,927  9/1948  Fischer .................................... 259/8
3,669,414  6/1972  Love ....................................... 259/8

Primary Examiner—Robert W. Jenkins
Attorney—Donnie Rudd and Milton C. Hansen

[57] ABSTRACT

A continuous mixer for mixing pancake and waffle batter and the like is disclosed having a mixing vessel having a conical shaped lower section and a cylindrical shaped upper section, two downward pushing propellers in the center of the mixer, a material removing port near the top of the mixer, means for rotating the propellers to create a vortex extending into the material removing port, and means for supplying material above the top propeller.

4 Claims, 1 Drawing Figure

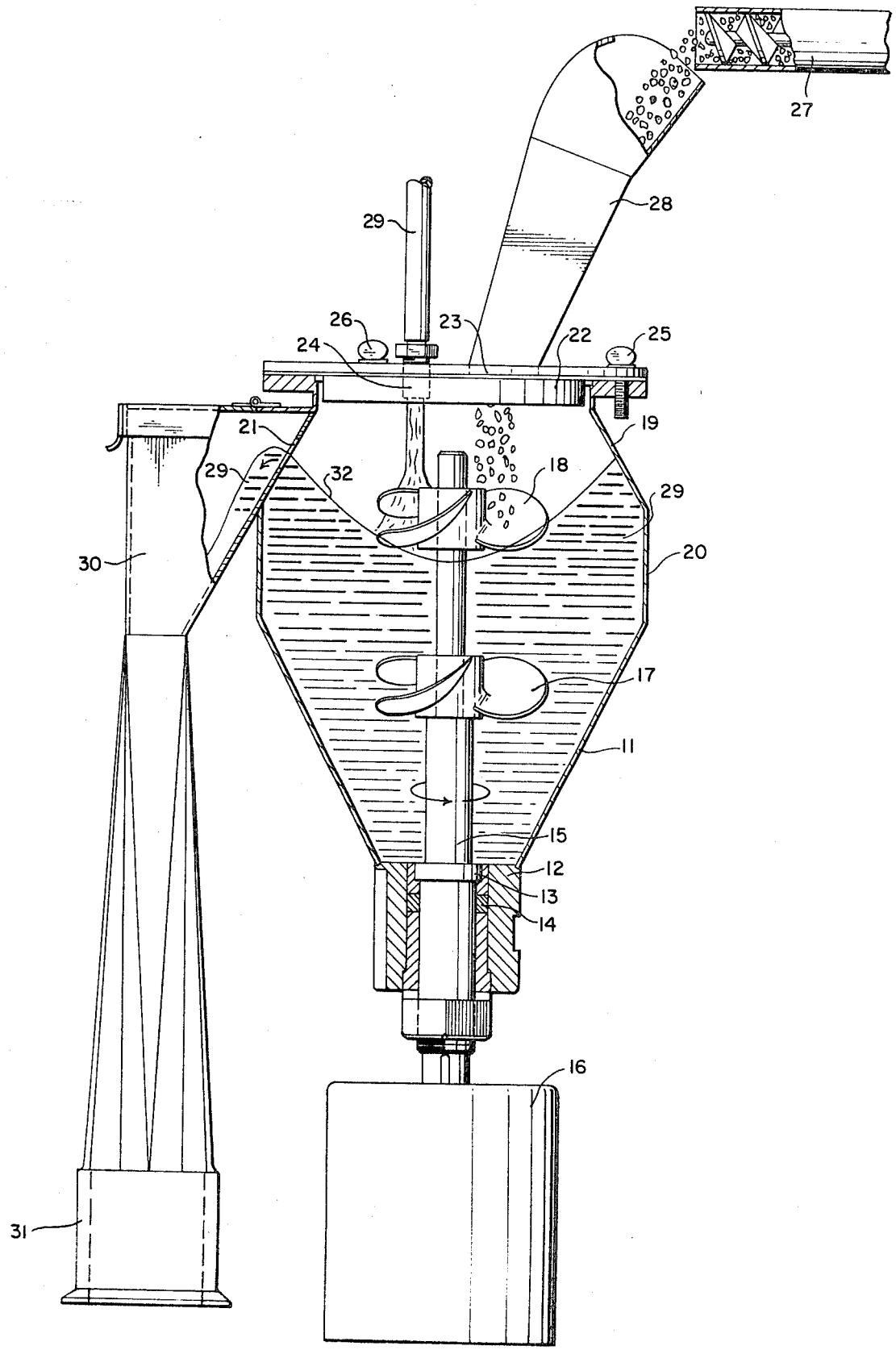

CONTINUOUS MIXER

BACKGROUND OF THE INVENTION

1. Field of the Invention

This invention relates to a continuous mixer useful in mixing pancake and waffle batter and the like.

2. Description of the Prior Art

Large scale production of pancakes and waffles is now developed to the stage that the cooking procedure is continuous in nature. In fact, everything about pancake and waffle production on a large scale basis is now continuous with the exception of production of the batter. Heretofore, there has not been developed a successful mixer for the continuous mixing of pancake and waffle batter which will guarantee uniformity in the batter for the quantities desired. The continuous mixer of this invention is an apparatus that overcomes the problems associated with the prior art.

Nowhere in the prior art has there ever been offered a mixing device with a low rate capability that also has a variable output over a significant range. The mixer of this invention provides variable output at almost any level but which can have a low output capability with proper mixing where desired. In conjunction with this advantage, the variable throughput of the apparatus of this invention makes possible a synchronization of the mixing system and the baking or cooking system.

Prior art mixers for pancake and waffle batter have always been a two-step system. First, a mixing operation was required to provide a slurry mix. Secondly, something had to be provided to take the slurry mix and finish it or blend it to a uniform, non-lumpy, finished, smooth mix. The mixer of this invention is both a slurry mixer and a finishing mixer in one continuous operation. This is an advantage not found in the prior art.

Prior art mixers have not been able to accomplish an intermittent operation. In prior art mixing, any attempt at a continuous mixer always required some leveling off or equilibrium mixing period with a consequent loss of product. The mixer of this invention with its unique shape and design, along with its top discharge, makes possible an intermittent operation that prevents fouling upon restarting and provides uniform batter or mix in a stop and go operation.

SUMMARY OF THE INVENTION

It is an object of this invention to provide a mixer for mixing pancake and waffle batter in a continuous operation.

It is another object of this invention to provide a continuous mixer for uniformly and consistently mixing pancake and waffle batter and the like.

The objects of this invention are accomplished by a continuous mixer for mixing a multiplicity of ingredients such as pancake and waffle batter and the like, said mixer comprising a mixing vessel having a bottom closed conical shaped lower section and a cylindrical shaped upper section; a lower downward pushing propeller located midway between the sides of the conical shaped lower section; an upper downward pushing propeller located midway between the sides of the cylindrical shaped upper section; a mixed material removing port, said port located in the mixing vessel wall above the lower portion of the upper downward pushing propeller; means for rapidly rotating the downward pushing propellers to force them to create a vortex in material placed in the vessel with the upper portion of the vortex extending into the material removing port and the center of the vortex being at or below the lower portion of the upper downward pushing propeller; and means for supplying mixable materials to the vessel above the upper downward pushing propeller.

Preferably, the continuous mixer of this application includes rotating means which are means for causing the sides of the cavity of the vortex to be coaxial to and substantially parallel to the sides of the conical shaped lower section of the mixer.

The prior art mixers have all required rather large power requirements to accomplish the mixing. Because of the shape of the vessel and the minimum amount of material being mixed at one time, the motor requirement for the mixing is much smaller and, thus, much less capital investment is required, even though total power for mixing may approach that of some of the prior art models. For the purpose of minimizing the amount of material in the mixer at one time, it is preferable to have the sides of the cavity of the vortex be substantially parallel to the sides of the conical shaped lower section.

Also preferably, the continuous mixer of this invention includes a conical shaped upper section wherein the removing port is located. I have also found it preferable in the production of pancake and waffle batter to provide a rotation speed on the propellers of at least about 3000 revolutions per minute.

It is to be understood that if a less viscous material were to be used, the speed of the propellers could be reduced. It is also to be understood that optimization of the operation may include some adjustment of the speed of the propellers depending on the viscosity of the batter mix. However, as I have stated, for most pancake and waffle batters, I prefer a rotational speed of at least about 3000 revolutions per minute.

In operation, batter mixture or dry ingredients are fed into the mixer above the upper propeller along with the liquid ingredients. The propellers are rotating and creating a vortex in the material. The ingredients are forced downward into the mixer and thoroughly mixed therein before emerging at the top of the vortex and exiting the mixer and go to the cooking operation.

BRIEF DESCRIPTION OF THE DRAWING

My invention may be more fully explained but is not limited by the attached drawing.

In the drawing, I have used the numeral 11 to indicate a bottom closed conical shaped lower section of the mixer. The bottom of the conical shaped lower section is closed by an appropriate connection plate 12 with seals 13 and 14 which extend around propeller drive shaft 15. The propeller drive shaft extends through the bottom of the bottom closed conical shaped lower section and is attached to motor 16 in order that the shaft may be rotated. Along the shaft is a lower downward pushing propeller 17 located midway between the sides of the conical shaped lower section, and an upper downward pushing propeller 18 located midway between the sides of the cylindrical shaped upper section. In the drawing, I have illustrated a conical shaped upper section 19, although this section may be an extension of the cylindrical shaped upper section 20. In the conical shaped upper section, I have indicated a mixed material removing port 21. The top of the mixer is closed by an appropriate closure plate 22 which has openings 23 and 24 for supplying the ingredients. The top plate is appropriately secured to the mixer by fastening means 25 and 26. A screw conveyor 27 is illustrated, although it does not limit the invention but is shown to supply a dry mixture of ingredients into chute 28 for entry into the mixer through opening 23. Also, the liquid ingredients are supplied through pipe 29 into entry port 24, both entry ports 23 and 24 being above the top propeller.

In operation, material is placed in the mixer and the motor started with a high revolution such as 3000 rpm or greater, and the ingredients are supplied in the appropriate places and in the appropriate amounts. A vortex is created in the mixed batter 29, and the top of the vortex extends into the removing port 21 thereby causing the mixed batter 29 to overflow into chute 30 where it goes into conveyor 31 which goes to the cooking operation. I have found it highly desirable that the sides of the vortex 32 be coaxial to and parallel, if possible, to the conical shaped lower section 11 due to an appropriate rotation of the propellers. This gives a more desirable uniform mixture exiting from the mixer.

DESCRIPTION OF THE PREFERRED EMBODIMENTS

The attached drawing and above description illustrate the preferred embodiment of this invention.

Having fully described this new and unique invention which provides the first practical mixing operation for the commercial production of batter for pancakes and waffles, I claim:

1. A continuous mixer for mixing a multiplicity of ingredients such as pancake and waffle batter and the like, said mixer comprising a mixing vessel having a bottom closed conical shaped lower section and a cylindrical shaped upper section; a lower downward pushing propeller located midway between the sides of the conical shaped lower section; an upper downward pushing propeller located midway between the sides of the cylindrical shaped upper section; a mixed material removing port, said port located in the mixing vessel wall above the lower portion of the upper downward pushing propeller; means for rapidly rotating the downward pushing propellers to force them to create a vortex in material placed in the vessel with the upper portion of the vortex extending into the material removing port and the center of the vortex being at or below the lower portion of the upper downward pushing propeller; and means for supplying mixable materials to the vessel above the upper downward pushing propeller.

2. A continuous mixer as in claim 1 wherein the means for rapidly rotating the downward pushing propellers is means for causing the sides of the cavity of the vortex to be substantially parallel to the sides of the conical shaped lower section.

3. A continuous mixer as in claim 1 wherein the cylindrical shaped upper section of the vessel is connected to a conical shaped upper section and the mixed material removing port is in the conical shaped upper section.

4. A continuous mixer as in claim 1 wherein the means for rapidly rotating the downward pushing propellers to force them to create a vortex is means for rotating the downward pushing propellers at a rotational speed above 3000 revolutions per minute.

* * * * *